(12) United States Patent
Knight et al.

(10) Patent No.: US 10,899,205 B1
(45) Date of Patent: Jan. 26, 2021

(54) CARGO COVERING APPARATUS

(71) Applicant: SHUR-CO, LLC, Yankton, SD (US)

(72) Inventors: Steven J. Knight, Mission Hill, SD (US); Joseph J. Healy, Yankton, SD (US); Jason Eugene Anderson, Yankton, SD (US)

(73) Assignee: Shur-Co, LLC, Yankton, SD (US)

( * ) Notice: Subject to any disclaimer, the term of this patent is extended or adjusted under 35 U.S.C. 154(b) by 203 days.

(21) Appl. No.: 16/151,493

(22) Filed: Oct. 4, 2018

Related U.S. Application Data

(60) Provisional application No. 62/569,029, filed on Oct. 6, 2017.

(51) Int. Cl.
| | | |
|---|---|---|
| *B60J 7/10* | (2006.01) | |
| *B60P 7/04* | (2006.01) | |
| *F16H 19/06* | (2006.01) | |
| *B60J 7/06* | (2006.01) | |

(52) U.S. Cl.
CPC ............... *B60J 7/102* (2013.01); *B60J 7/06* (2013.01); *B60P 7/04* (2013.01); *F16H 19/06* (2013.01); *B60Y 2200/147* (2013.01); *F16H 2019/0613* (2013.01)

(58) Field of Classification Search
CPC .............. B60J 7/062; B60J 5/02; B60J 7/102
USPC ........... 296/100.18, 100.12, 100.17, 100.15, 296/100.16, 186.1, 100.01; 403/205, 295
See application file for complete search history.

(56) References Cited

U.S. PATENT DOCUMENTS

| | | | | |
|---|---|---|---|---|
| 6,234,561 | B1 * | 5/2001 | Huotari | B60J 7/10 296/100.15 |
| 6,793,273 | B1 * | 9/2004 | Tuerk | B60J 7/062 296/180.1 |
| 7,165,803 | B2 * | 1/2007 | Malmberg | B60J 7/102 296/100.15 |
| 7,854,465 | B2 | 12/2010 | Leblanc | |
| 7,931,326 | B2 | 4/2011 | Beshiro | |
| 8,172,477 | B2 | 5/2012 | Damsi | |
| 8,235,447 | B2 | 8/2012 | Damsi | |
| 8,567,848 | B2 | 10/2013 | Damsi | |

(Continued)

OTHER PUBLICATIONS

Conestoga XP Installation Manual, 2010, pp. 1-20, Aero Industries, Inc.

(Continued)

*Primary Examiner* — D Glenn Dayoan
*Assistant Examiner* — Sunsurraye Westbrook
(74) *Attorney, Agent, or Firm* — Jeffrey A. Proehl; Woods, Fuller, Shultz & Smith, PC

(57) ABSTRACT

A cargo cover apparatus configured to selectively enclose a space above an upper surface of a cargo support bed may include at least one bulkhead mountable on the bed toward one said end of the bed, and a cover assembly mountable on the bed in a position between the forward and rearward ends of the bed and toward the at least one bulkhead. The cover assembly has a front end and a rear end, with one of the ends of the cover assembly being orientable toward the at least one bulkhead, and may be extendable and retractable to change a distance between the front end and the rear end of the cover assembly along the longitudinal axis of the bed. The apparatus also include a securing assembly configured to secure one of the ends of the cover assembly to the at least one bulkhead.

20 Claims, 13 Drawing Sheets

(56) References Cited

U.S. PATENT DOCUMENTS

2004/0150245 A1* 8/2004 Wheatley ............... B60J 7/102
                                              296/100.15
2010/0078136 A1* 4/2010 Beshiri ................. B60J 7/104
                                              160/293.1

OTHER PUBLICATIONS

Conestoga XP Operations Flyer, 2015, pp. 1-2, Aero Industries, Inc.
Conestoga XP Rolling Tarp System Brochure, 2015, pp. 1-6, Aero Industries, Inc.
Conestoga 2, Operation & Maintenance Manual, 2015, pp. 1-4, Aero Industries, Inc.
Conestoga 2 Roll Curtain, Operations Flyer, 2015, pp. 1-2, Aero Industries, Inc.
ShurTite Retractable Tarp Systems, Flyer, pp. 1-2, Shur-Co, LLC.
ShurTite Retractable Tarp Systems, Installation Manual Rev. G, 2014, pp. 18, 19, 38, 39.

* cited by examiner

CARGO COVERING APPARATUS

REFERENCE TO RELATED APPLICATIONS

This application claims the benefit of U.S. Provisional Patent Application No. 62/569,029, filed Oct. 6, 2017, which is hereby incorporated by reference in its entirety.

BACKGROUND

Field

The present disclosure relates to cargo covers and more particularly pertains to a new cargo covering apparatus for simplifying securement of a cover assembly to a bulkhead of the covering apparatus.

SUMMARY

The present disclosure relates to a cargo cover apparatus which may be configured to selectively enclose a space above the upper surface of a cargo support bed having a forward end and a rearward end with a longitudinal axis of the bed extending between the ends. The cargo cover apparatus may comprise at least one bulkhead mountable on the bed. The cargo cover apparatus may also include a cover assembly mountable on the bed in a position between the forward and rearward ends of the bed. The cover assembly has a front end and a rear end, with one of the ends of the cover assembly being orientable toward the at least one bulkhead, and is extendable and retractable to change a distance between the front end and the rear end of the cover assembly along the longitudinal axis of the bed. The cargo cover apparatus may further include a securing assembly configured to pull said one end of the cover assembly and the at least one bulkhead toward each other without human handling when the cover assembly and the bulkhead are separated by a gap therebetween and to secure said one end of the cover assembly to the at least one bulkhead.

In another aspect, the disclosure relates to a system which may comprise a vehicle bed having a longitudinal axis and an upper surface extending between forward and rearward ends, and a cargo cover apparatus configured to selectively enclose a space above the upper surface of the vehicle bed. The cargo cover apparatus may comprise a front bulkhead located on the vehicle bed toward the forward end of the bed, a cover assembly mounted on the vehicle bed in a position between the forward and rearward ends of the bed, with the cover assembly having a front end and a rear end. The forward end of the cover assembly may be orientable toward the front bulkhead, and the cover assembly may be extendable and retractable to change a distance between the front end and the rear end of the cover assembly along the longitudinal axis of the bed. The cover apparatus may further include a securing assembly configured to pull the forward end of the cover assembly and the front bulkhead toward each other without human handling when the cover assembly and the bulkhead are separated by a gap therebetween and to secure the forward end of the cover assembly to the front bulkhead.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
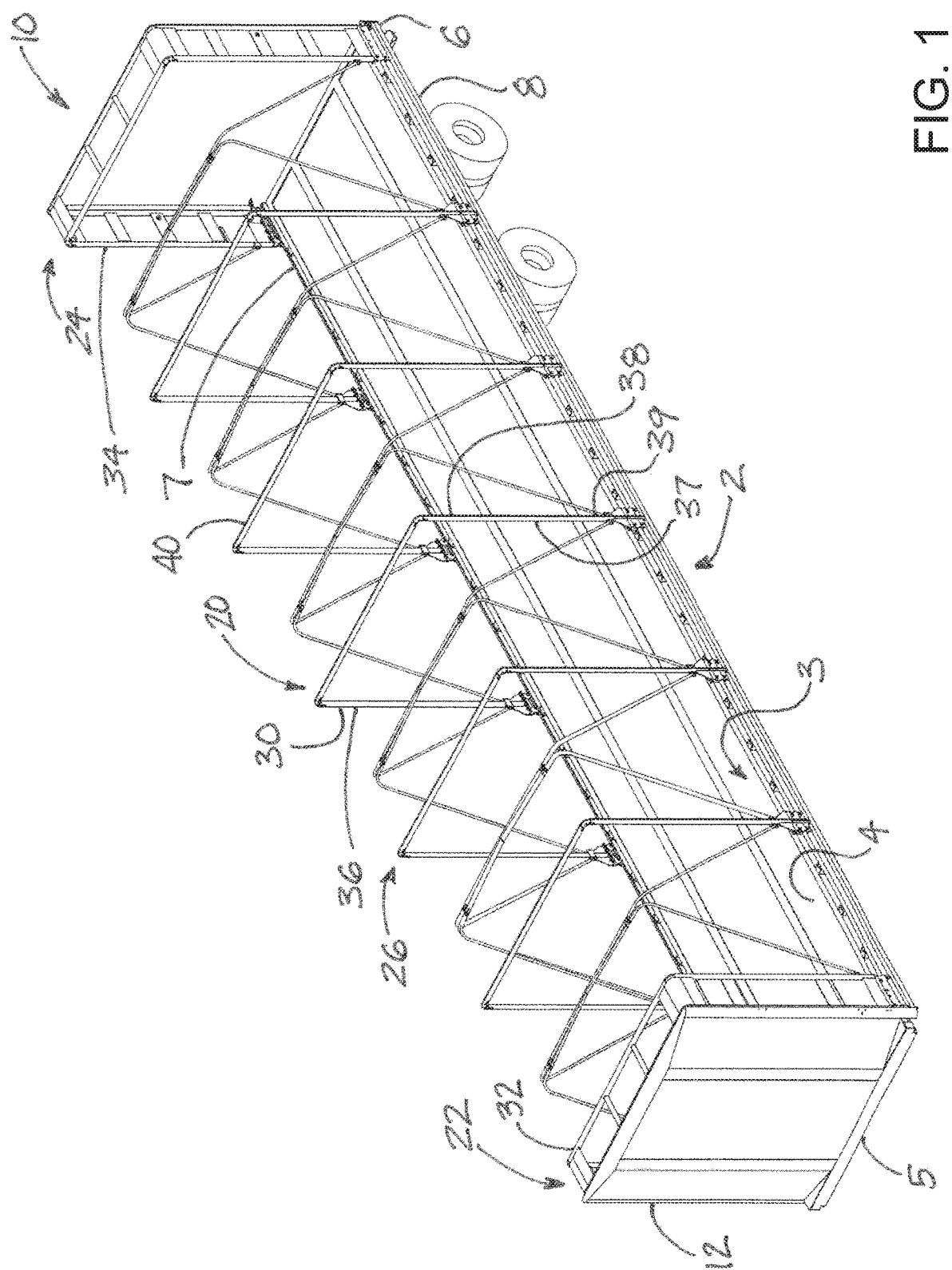
FIG. 1 is a schematic perspective view of a system implementing a new cargo covering apparatus according to the present disclosure, with the covering sheet removed to reveal detail of the cover assembly.
Figure 2:
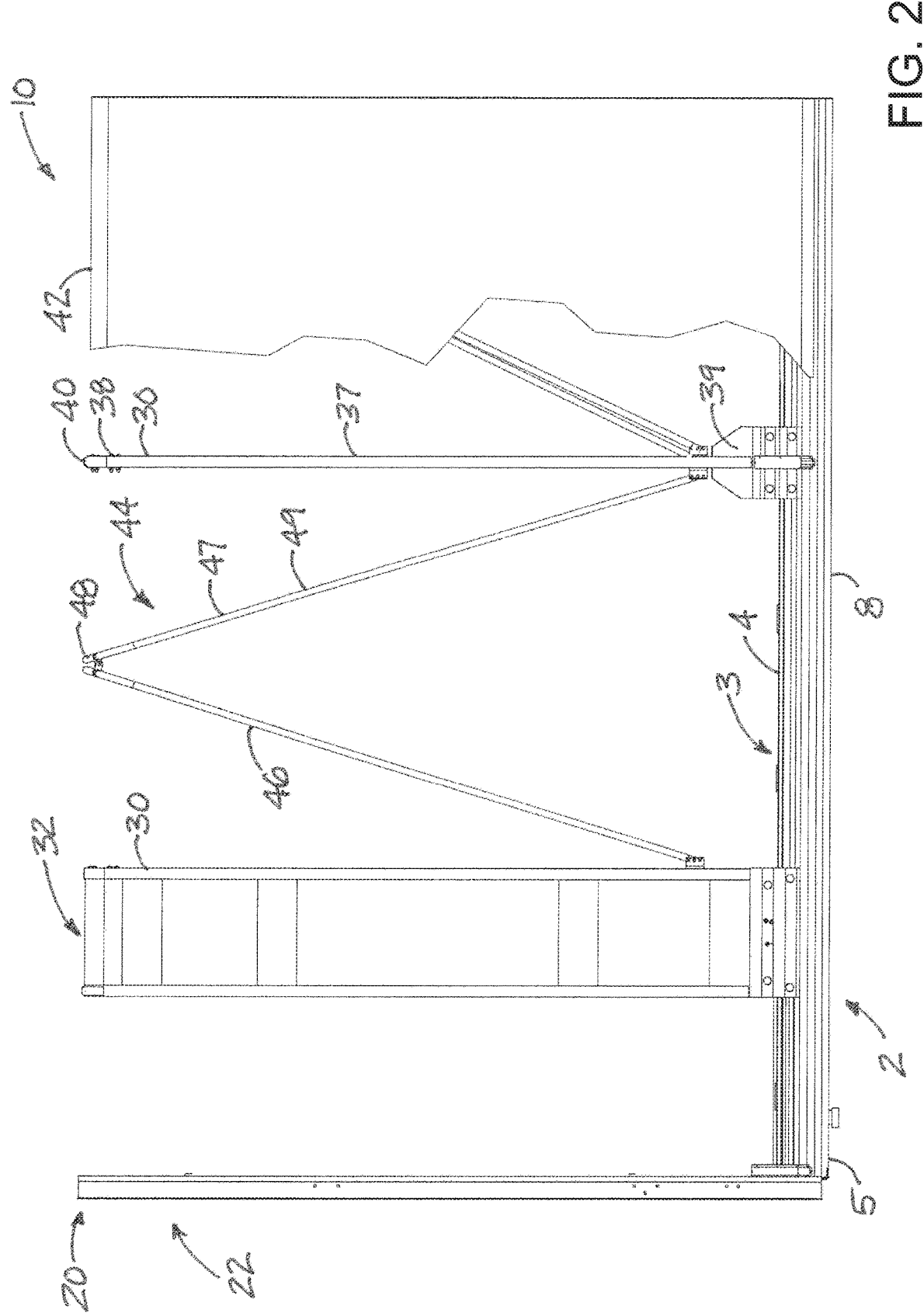
FIG. 2 is a schematic side view of a portion of the system showing the foremost support bow of the cover assembly retracted and disengaged from the front bulkhead of the cover apparatus, according to an illustrative embodiment.
Figure 3:
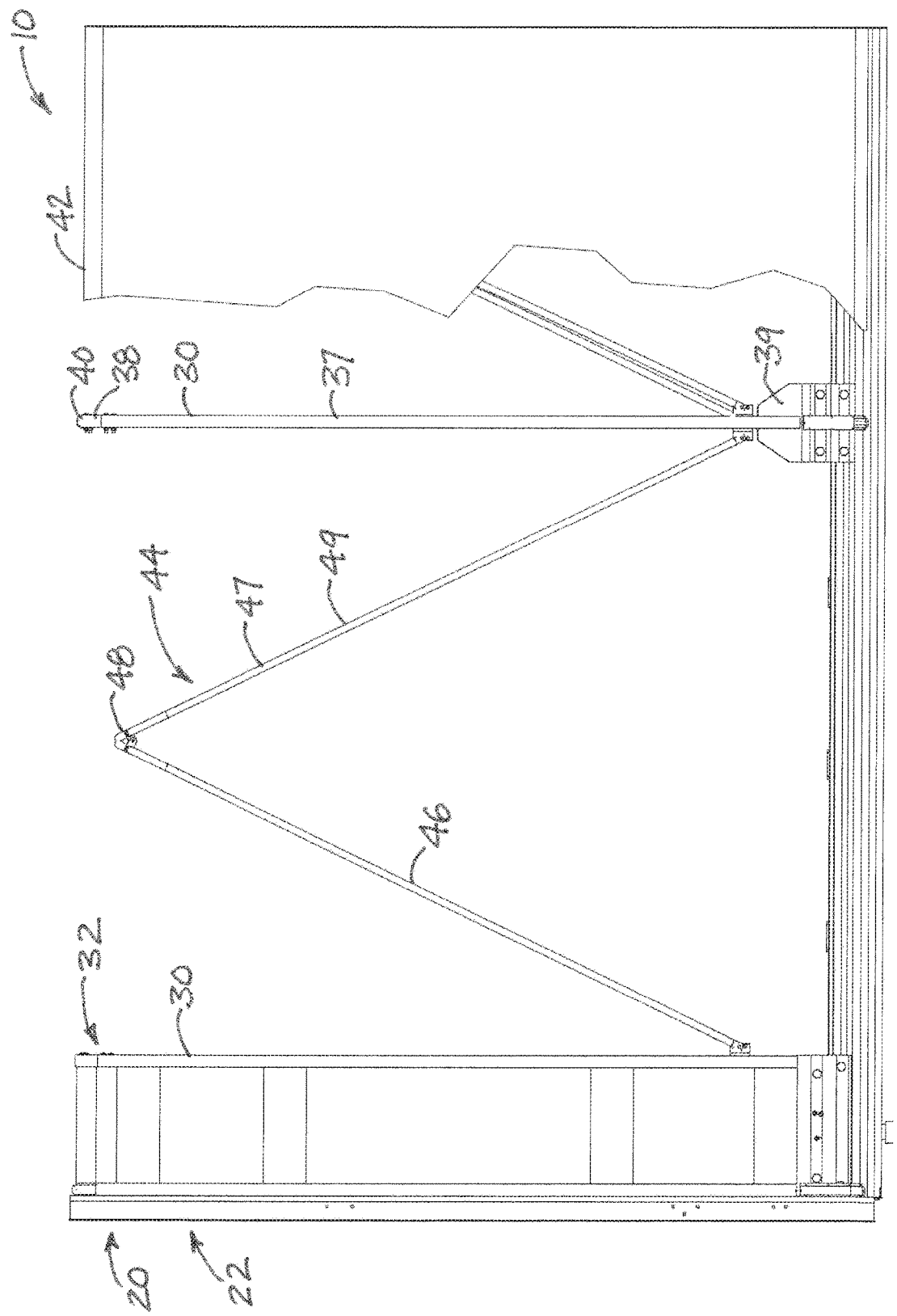
FIG. 3 is a schematic side view of a portion of the system showing the foremost support bow of the cover assembly extended and engaged with the front bulkhead of the cover apparatus, according to an illustrative embodiment.
Figure 4:
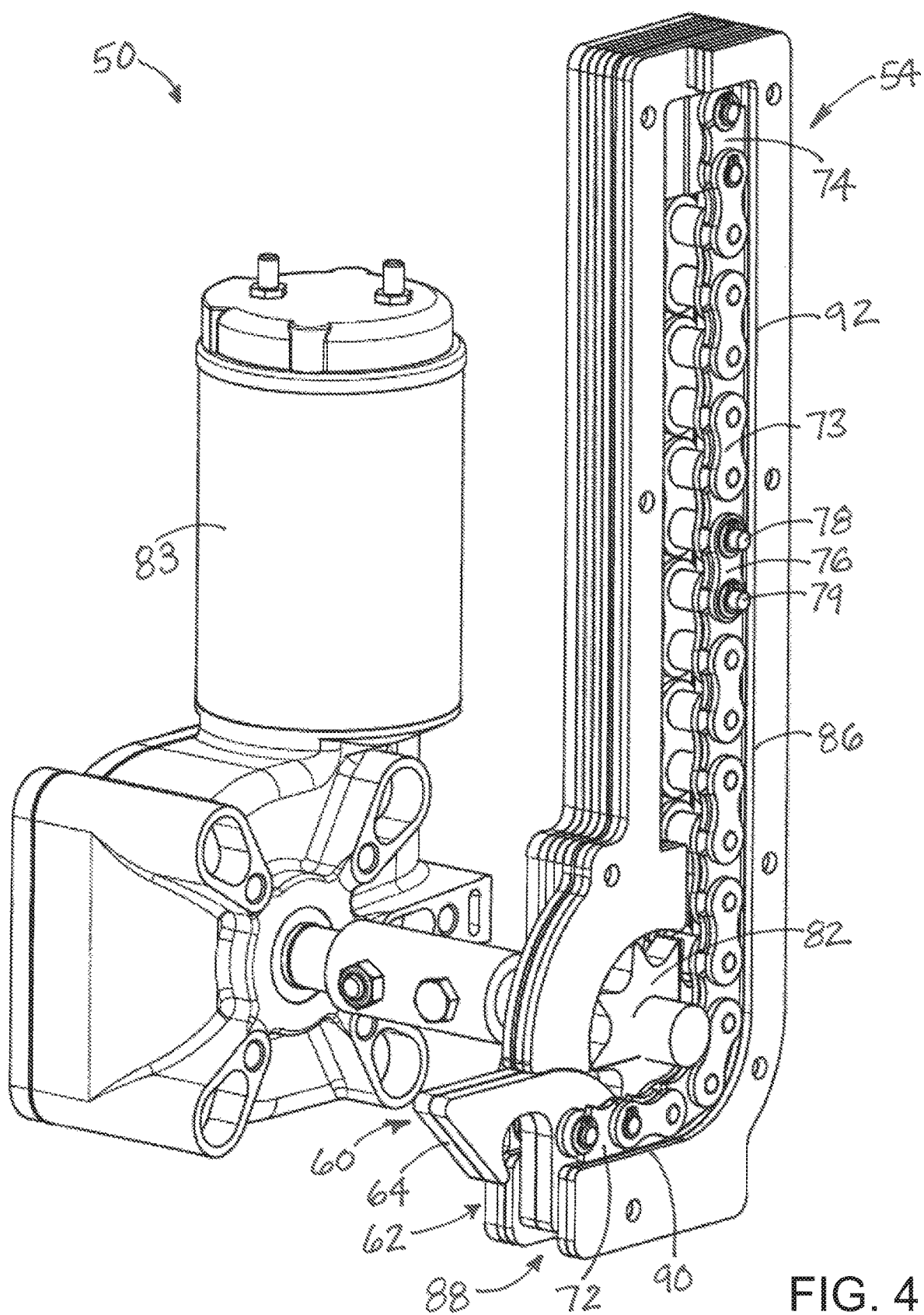
FIG. 4 is a schematic perspective view of elements of the securing assembly with a portion of the housing removed to reveal detail of the support member and the guide track, according to an illustrative embodiment.
Figure 5:
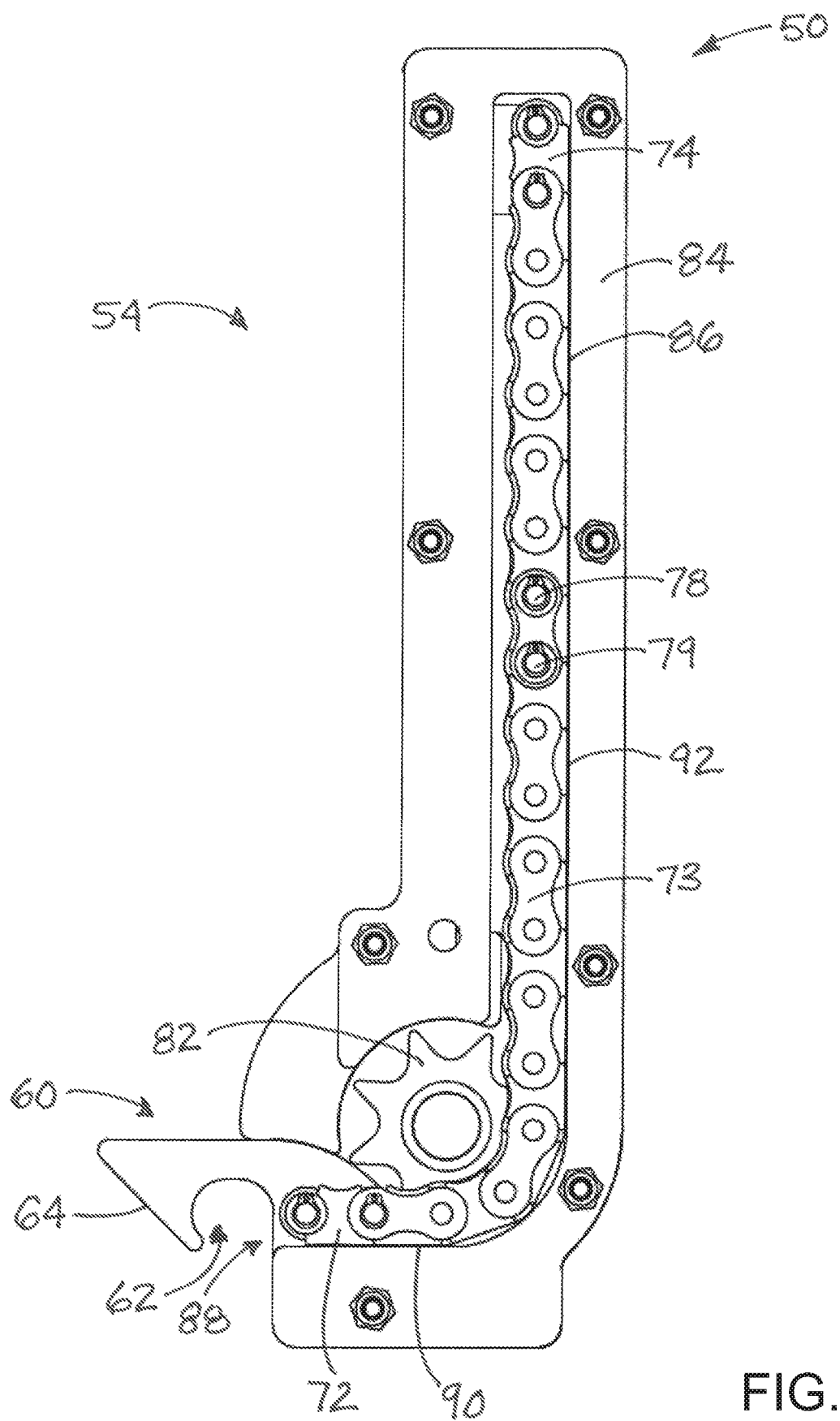
FIG. 5 is a schematic side view of elements of the securing assembly with a portion of the housing removed to reveal detail of the hook and hook support shown in a retracted position generally corresponding to the secured condition of the securing assembly, according to an illustrative embodiment.
Figure 6:
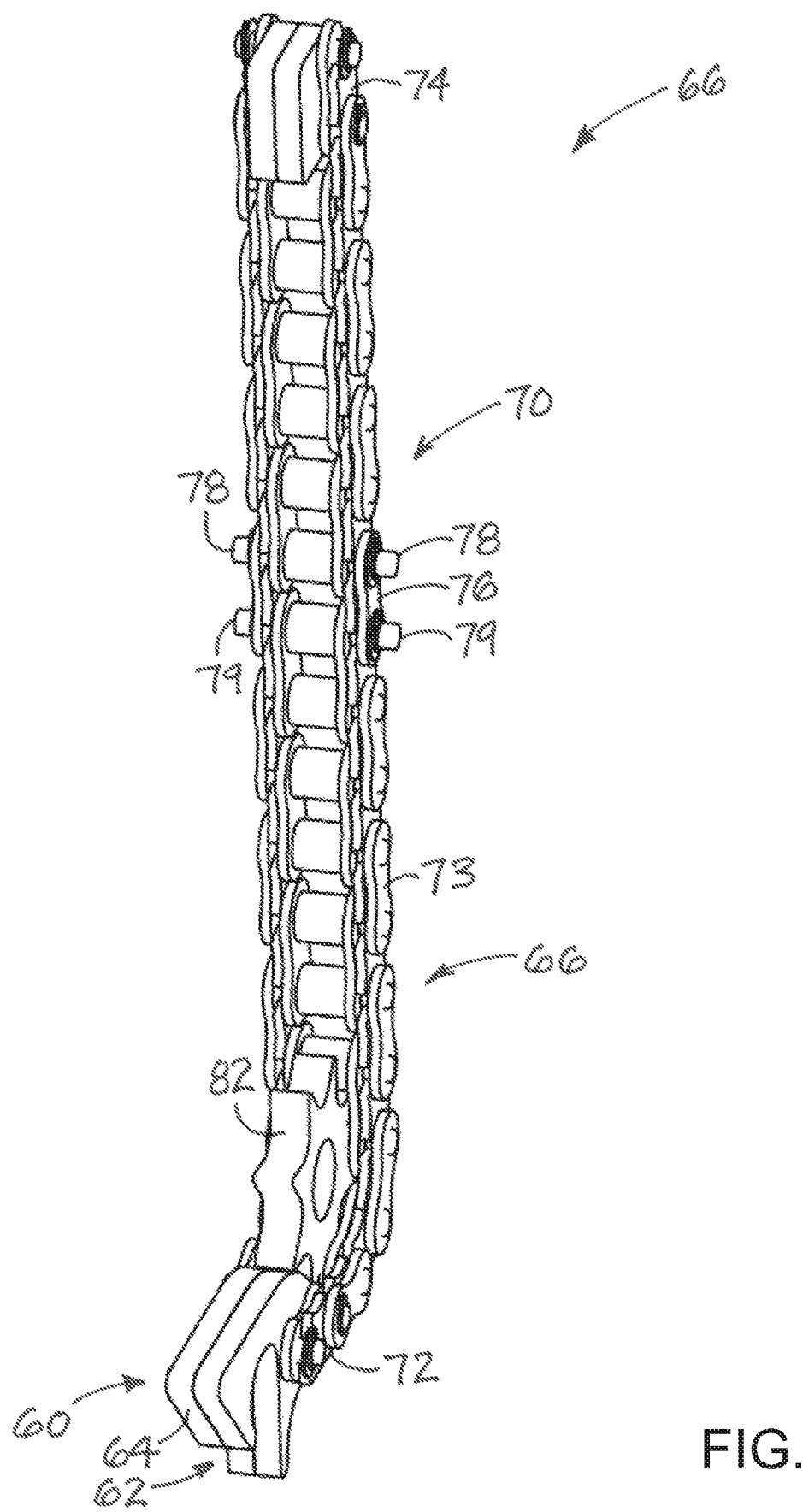
FIG. 6 is a schematic perspective view of the chain of links of the illustrative support member and the hook of the securing assembly isolated from the housing, according to an illustrative embodiment.
Figure 7:
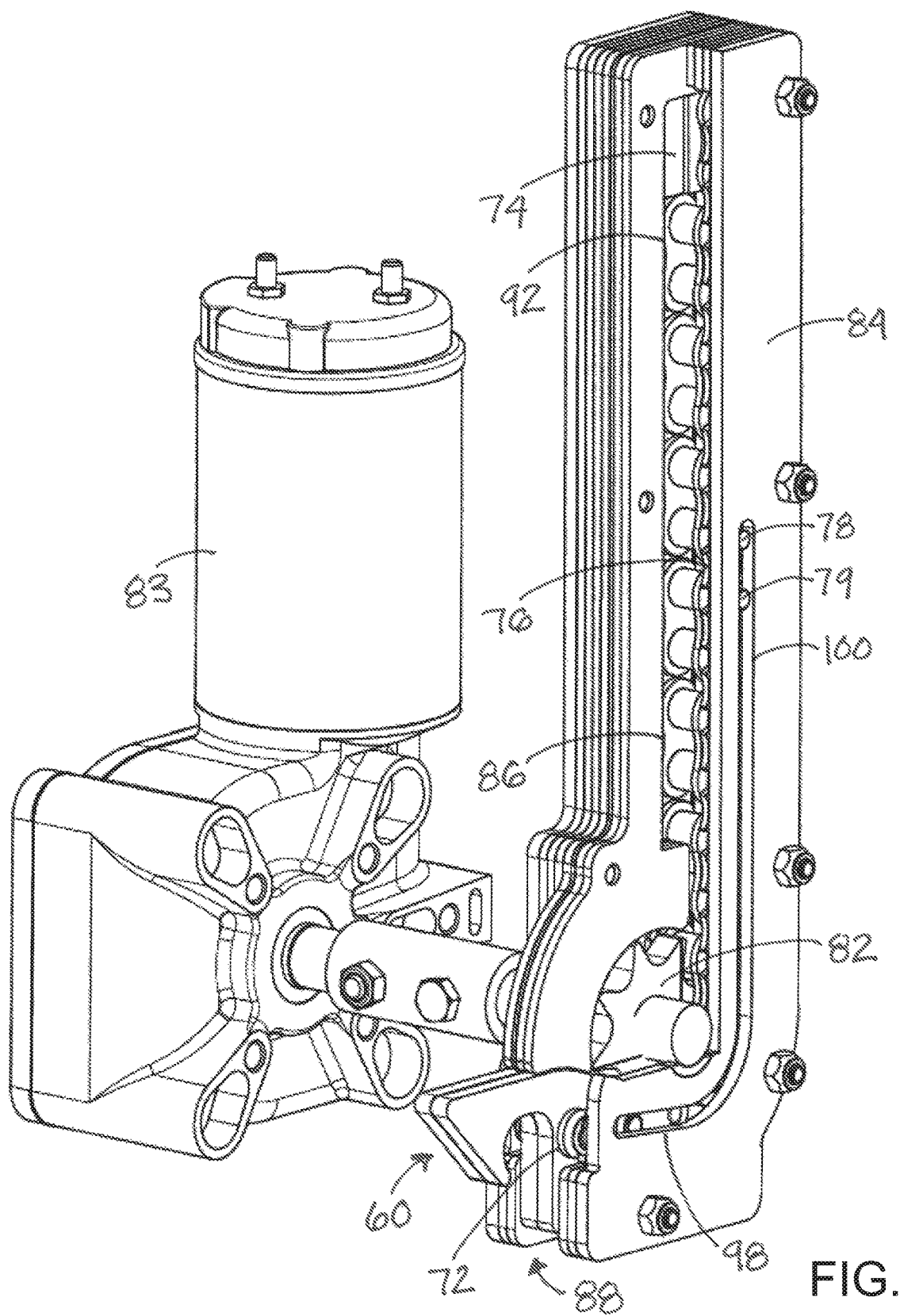
FIG. 7 is a schematic perspective view of elements of the securing assembly with a portion of the housing removed to reveal detail of the support member, guide track, and lateral slot, according to an illustrative embodiment.
Figure 8:
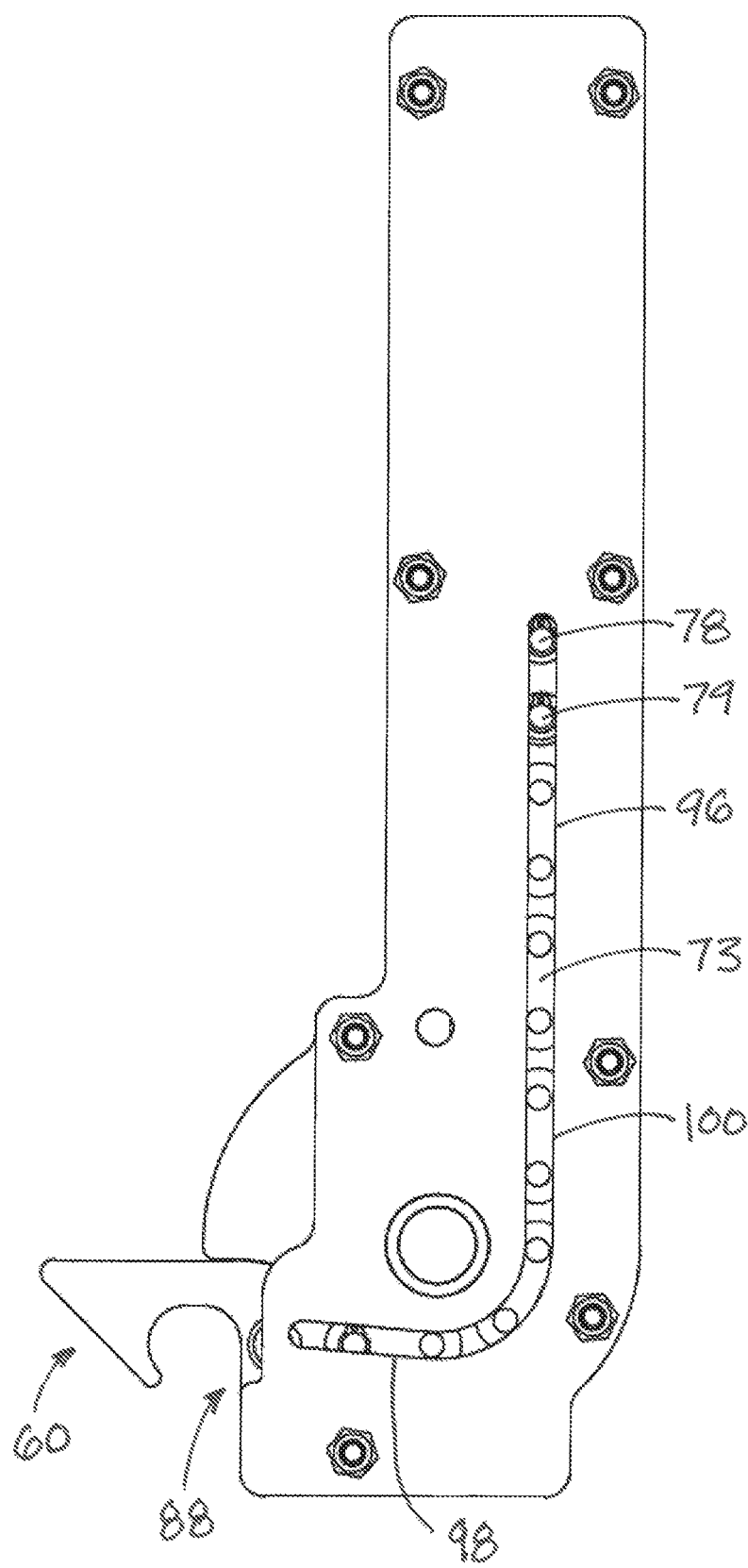
FIG. 8 is a schematic side view of elements of the securing assembly in the securing condition with a portion of the housing removed to reveal detail of the lateral pins on the guide link of the chain of links of the support member with respect to the lateral slot of the housing, according to an illustrative embodiment.
Figure 9:
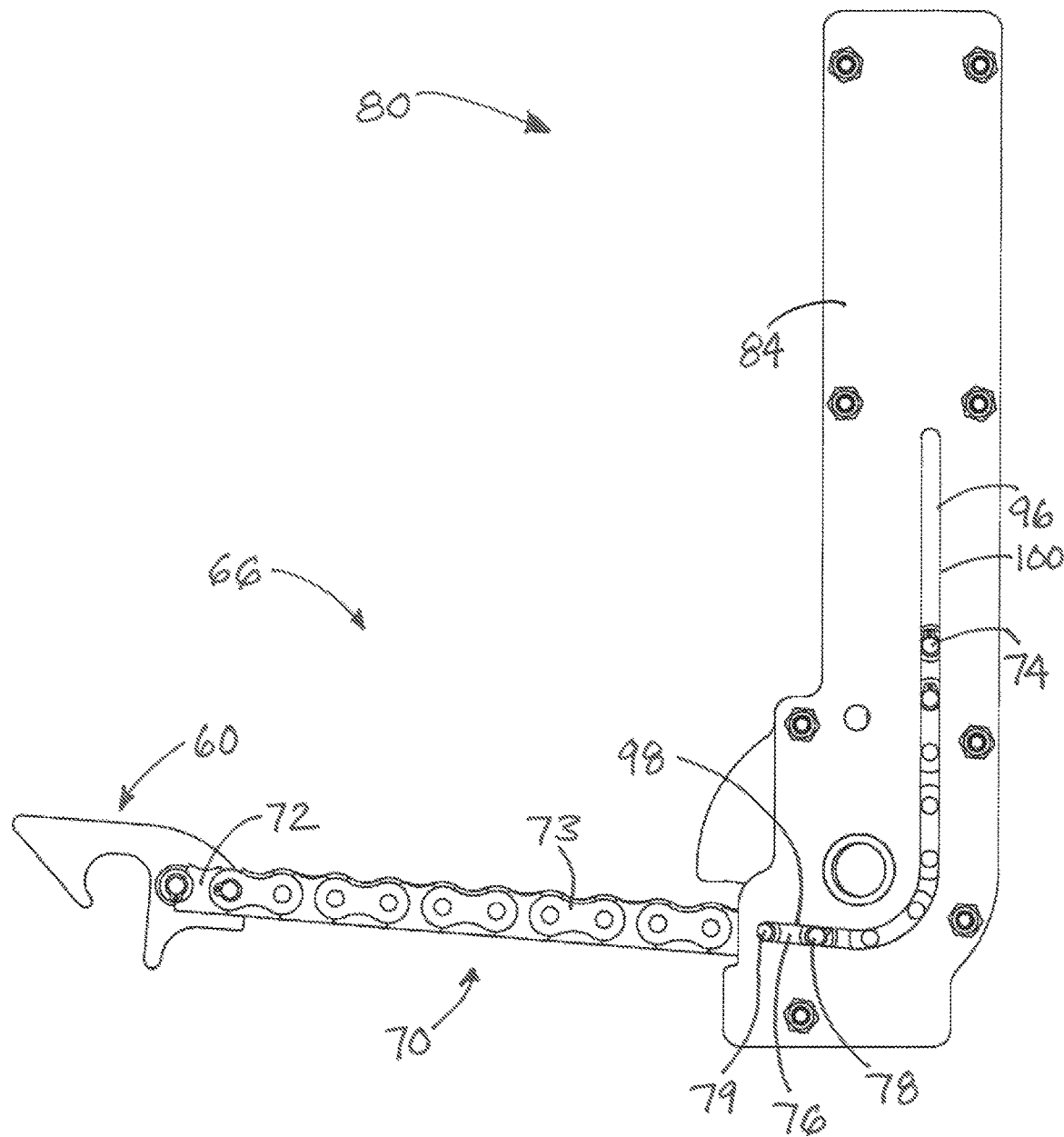
FIG. 9 is a schematic side view of elements of the securing assembly as shown in FIG. 8 but with the securing assembly in the release condition, according to an illustrative embodiment.
Figure 10:
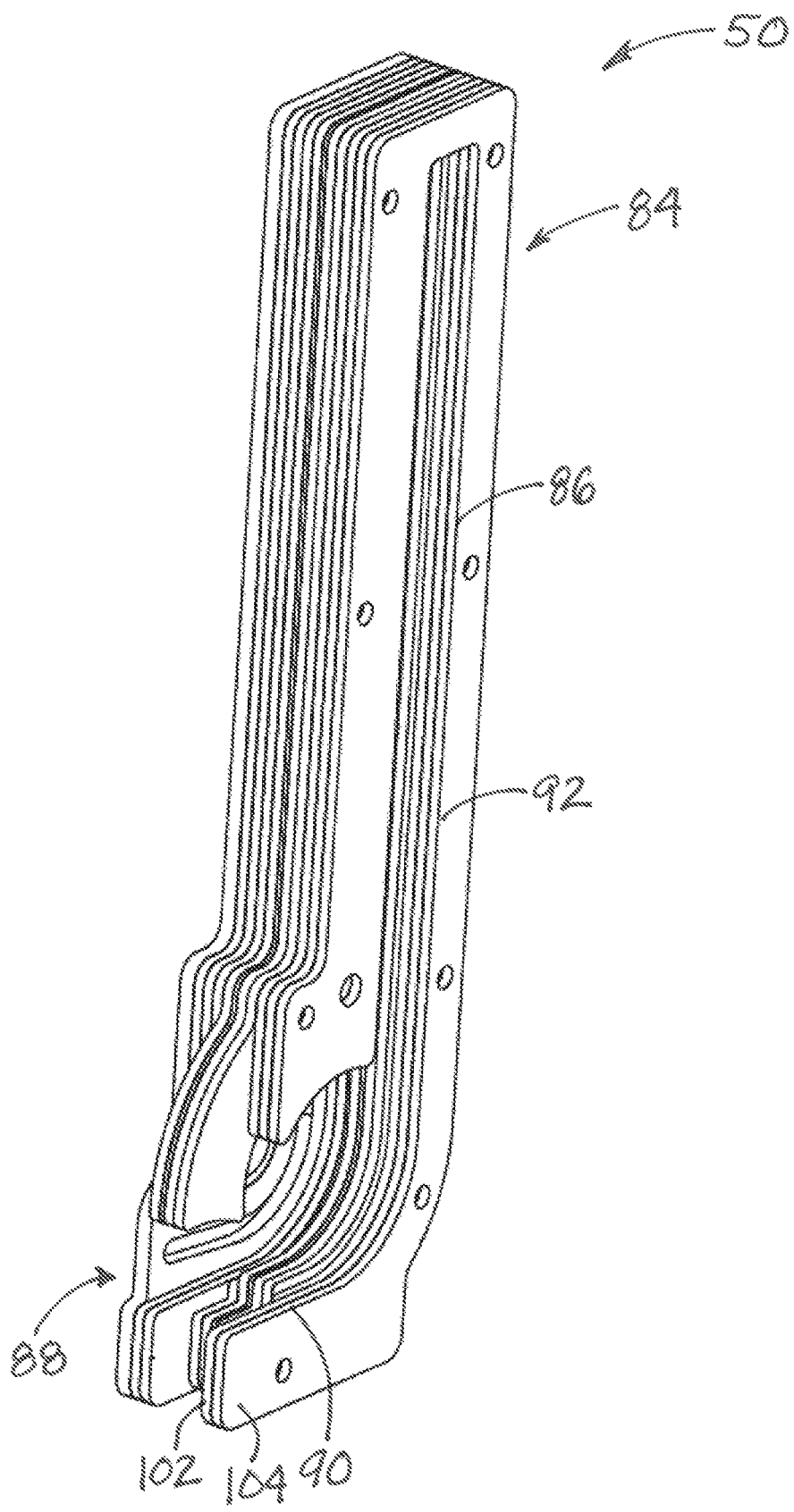
FIG. 10 is a schematic perspective view of elements of the housing of the securing assembly shown isolated from other elements of the securing assembly and shown with plates of the housing removed to reveal detail of the guide track, according to an illustrative embodiment.

With reference now to the drawings, and in particular to FIGS. 1 through 13 thereof, a new cargo covering apparatus embodying the principles and concepts of the disclosed subject matter will be described.

Systems have been developed for at least partially enclosing cargo positioned on the flat bed of a vehicle when transported over roads at highway speeds. Examples of such systems can be found in, for example, U.S. Pat. No. 7,931,326; U.S. Pat. No. 8,172,477; U.S. Pat. No. 8,235,447; and U.S. Pat. No. 8,567,848, each of which is hereby incorporated by reference in its entirety.

The applicants have recognized that, while many of the existing systems are highly useful, the existing technology could benefit from improvements that enhance the ease of use of the systems. Known systems tend to require the user to move to two or more locations about the flatbed to operate the system and frequently require the user to walk at least the entire length of the flatbed, which can measure 50 feet or more in length. The applicants have developed a system, and in particular a cover apparatus including a securing assembly for the cover apparatus, which minimizes the actions needed to be taken by the user to secure the cover apparatus for travel over a highway.

In one aspect, the disclosure relates to a system 1 which may include a vehicle 2, such as a truck or a trailer, having a vehicle bed 3 which is carried by the truck or trailer frame. The bed 3 has an upper surface 4 which is typically substantially planar in a single plane, although other suitable beds may have an upper surface lying in two or more planes that are typically oriented substantially parallel to each other. The bed 4 may be elongated with a forward end 5 and a rearward end 6 located at an opposite end of the elongated bed from the forward end. The bed may also have opposite lateral sides 7, 8 which may extend between the forward 5 and rearward 6 ends of the bed.

Another aspect of the disclosure relates to a cargo cover apparatus 10 which may be utilized in combination with the bed 3 as a part of the system 1, and also may be utilized separate of the system. The cargo cover apparatus 10 may be configured to selectively enclose a portion of the space located above the upper surface 4 of the bed. The cargo cover apparatus 10 may be mountable on the bed so that the apparatus 10 moves with the bed and the vehicle, and may be moved with the vehicle 2 over the road at highway speeds.

The cargo cover apparatus 10 may include at least one bulkhead, and for the purposes of this disclosure will be described as a front bulkhead 12 which effectively forms the front of the cover apparatus. Optionally, the at least one bulkhead could be a rear bulkhead which might form the rear of the cover apparatus. The front bulkhead 12 may be mountable on the bed 3 toward the forward end 5 of the bed. The front bulkhead 12 may extend upwardly from the bed when mounted thereon. Typically, the front bulkhead 12 may be immovably mounted on the bed such that some degree of disassembly or detachment is required in order to move the bulkhead with respect to the bed.

The cover apparatus 10 may also include a cover assembly 20 which is mountable on the bed 3 in a position between the forward 5 and rearward 6 ends of the bed. The cover assembly 20 may have a front end 22 and a rear end 24, with the front end generally being oriented toward the forward end 5 of the bed and the front bulkhead 12 and the rear end 24 being oriented toward the rearward end 6. In embodiments in which a front bulkhead 12 is employed, typically a flap or similar structure forms a closure on the rear end 24 of the cover assembly and the closure moves with the rear end 24. The cover assembly may also have opposite sides 26, 27 for positioning adjacent to the lateral sides 7, 8 of the bed 3. The cover assembly 20 may be extendable and retractable to change or alter a distance or length between the front 22 and rear 24 ends of the cover assembly. The extension and retraction movement is generally oriented in the longitudinal direction of the elongated bed 3. Correspondingly, extension of the cover assembly 20 generally moves the front and rear ends of the assembly toward the respective forward and rearward ends of the bed, while retraction of the assembly 20 generally moves at least one of the ends of the cover assembly away from the respective end of the bed.

The cover assembly 20 may be extendable into an extended condition, and retractable into a retracted condition. The extended condition may be characterized by the distance between the front and rear ends of the cover assembly being relatively longer and the retracted condition may be characterized by the distance between the front and rear ends being relatively shorter. Further, the extended condition may also be characterized by the front end of the cover assembly being positioned adjacent to the front bulkhead and the rear end of the cover assembly being positioned adjacent to the rearward end of the bed. The retracted condition may be characterized by the front end of the cover assembly being spaced from the front bulkhead.

A plurality of support bows may be included in the cover assembly 20 which are positioned between the forward and rearward ends of the bed, and with respect to the front bulkhead. The support bows 30 may be movable with respect to the ends 5, 6 and the bulkhead along an axis that is generally parallel to the longitudinal axis of the bed. The support bows may be configured to extend upwardly from the upper surface of the bed, and may extend laterally from locations proximate to one lateral side of the bed to locations proximate to the opposite lateral side of the bed. The plurality of support bows 30 may include a foremost support bow 32 which is positioned at the front end 22 of the cover assembly and a rearmost support bow 34 positioned at the rear end 24 of the cover assembly.

Illustratively, each of the support bows 30 may include a pair of side portions 36, 37 with each of the side portions being substantially vertically oriented in a substantially perpendicular relationship with the upper surface 4 of the bed. Each of the side portions 36, 37 may have an upper end 38 and a lower end 39. The lower ends 39 of the side portions may be configured to move along the upper surface or the lateral side of the bed, such as along a track of the kind disclosed in the aforementioned and incorporated U.S. patents. Each of the support bows 30 may also include a top portion 40 which extends between the side portions, and more specifically the upper ends 38 of the side portions, to bridge therebetween. Typically, the top portion 40 of the bow is substantially horizontally oriented.

The cover assembly 20 may also include a covering sheet 42 which extends across the support bows 30, and typically extends from the foremost support bow 32 to the rearmost support bow 34. In some implementations, the covering sheet 42 may comprise a series of individual sheet segments which may be individually attached to adjacent support bows. The covering sheet 42 may be flexible in character to permit the sheet 42 to fold when the cover assembly is moved toward the retracted condition and unfold when the cover assembly is moved toward the extended condition in an accordion fashion. The covering sheet 42 may be formed from a flexible material, and the material may exhibit a small degree of elasticity.

A plurality of linking frames 44 may be provided in the cover assembly to support sections of the covering sheet 42 between the adjacent support bows 30. Each linking frame 44 may be positioned between a pair of adjacent support bows to support portions of the sheet 42 between the adjacent bows. Each linking frame 44 may also be linked to the adjacent support bows in a manner permitting movement of the support bows closer to and away from each other. Illustratively, each of the linking frames 44 may include a pair of linking bows 46, 47 which may be substantially U-shaped in an inverted orientation. Each of the linking bows 46, 47 of the frame 44 may include an upper section 48, and in some embodiments the upper sections of the linking bows of a frame 44 may be pivotally connected together. Each linking bow may also include a side section 49 which extends downwardly from each of the ends of the upper section 48 to form the inverted U-shape. A lower end of the side section 49 may be pivotally mounted to the adjacent support bow to link or connect the linking bows to the support bows.

The cargo cover apparatus 10 may also include a securing assembly 50 which is configured to secure an end of the cover assembly 20 to a bulkhead, such as the front end 22 to the front bulkhead 12. The securing assembly 50 may be utilized on the at least one bulkhead and the corresponding end of the cover assembly, and for the purposes of this description will be described in connection with the front end 22 of the cover assembly and the front bulkhead 12. More specifically, the securing assembly 50 may be configured to secure the foremost support bow 32 of the cover assembly to the front bulkhead 12. A securing assembly 50 may be mounted on at least one lateral side 26 and a corresponding lateral side of the corresponding bulkhead of the cover assembly, and preferably may be mounted on both of the sides 26, 27 of the cover assembly and both lateral sides of the bulkhead. Illustratively, the securing assemblies may be located vertically approximately halfway between the bed and the uppermost extent of the bulkhead, although other vertical locations may also be employed. In some embodiments, multiple securing assemblies may be utilized on each lateral side of the cover assembly and bulkhead, with one assembly being located at a vertical height that is relatively higher than another assembly. In embodiments utilizing multiple securing assemblies, the assemblies may be configured to operate similarly and substantially simultaneously with each other such that the assemblies cause movement of the cover assembly toward the bulkhead to occur in a substantially balanced manner.

Figure 11:
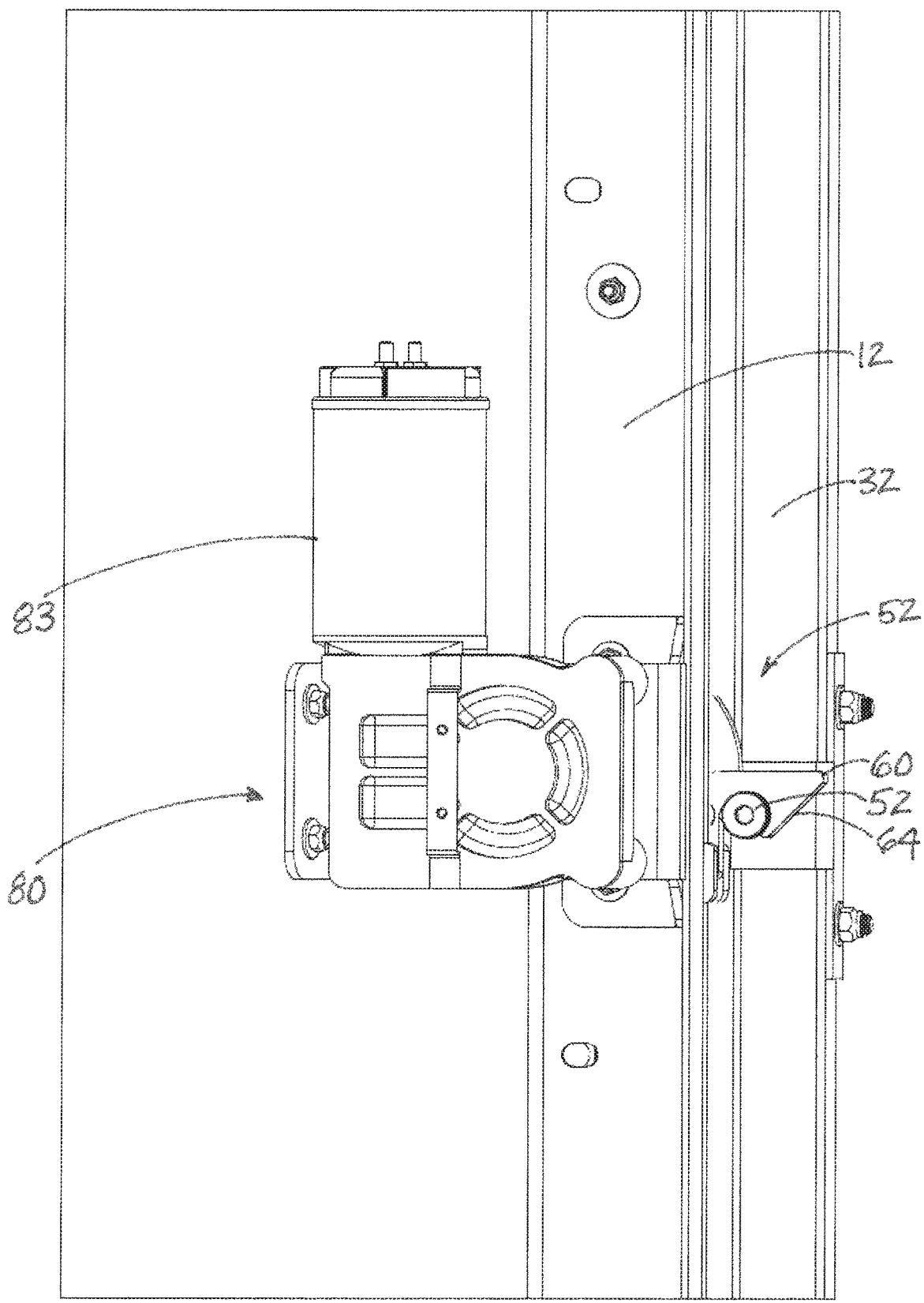
FIG. 11 is a schematic side view of elements of the front bulkhead, cover assembly, and securing assembly with the securing assembly shown in the securing condition, according to an illustrative embodiment.
Figure 12:
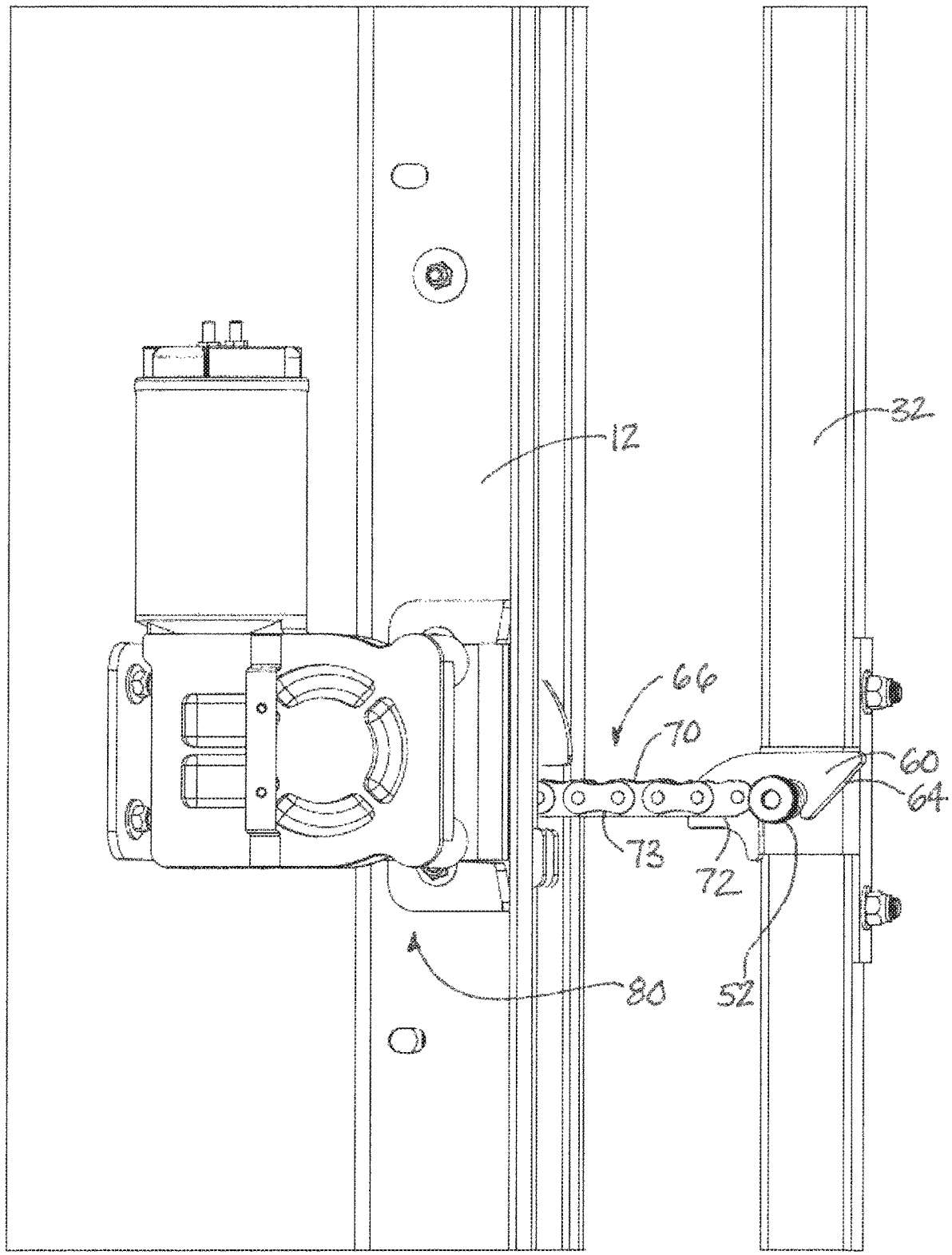
FIG. 12 is a schematic side view of elements of the front bulkhead, cover assembly, and securing assembly with the securing assembly shown in the reception condition, according to an illustrative embodiment.
Figure 13:
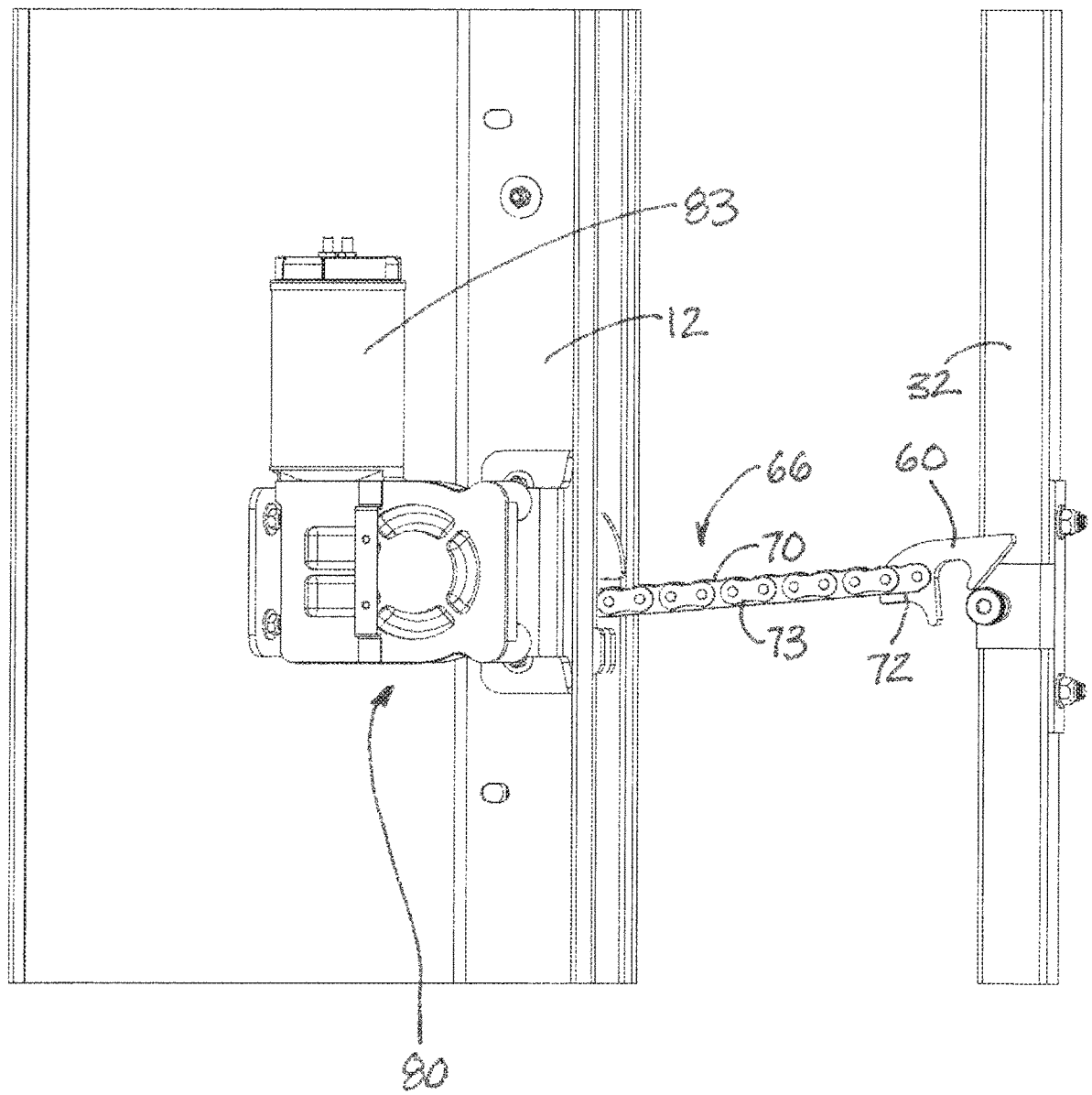
FIG. 13 is a schematic side view of elements of the front bulkhead, cover assembly, and securing assembly with the securing assembly shown in the release condition, according to an illustrative embodiment.

Generally, the securing assembly 50 may have a secured condition in which the end of the cover assembly 20 may be secured to the bulkhead 12, such as is illustrated in FIGS. 11 and 12, in a manner suitable for over the road movement of the system 1. The securing assembly may also have a release condition in which the end of the cover assembly is released from the securing assembly, such as is illustrated in FIG. 13, to permit access to the space adjacent to the bed of the trailer and any cargo resting upon the bed. The securing assembly may further include a reception condition in which the securing assembly is available to be engaged with the bulkhead but is not actually engaged with the bulkhead, such as is illustrated in FIG. 12.

In some embodiments, the securing assembly 50 may include a post 52 which may be located on the cover assembly or on the bulkhead. Most suitably, the post 52 is mounted on the support bow of the cover assembly. The post 52 may extend substantially horizontally from the support bow (such as the foremost support bow). The securing assembly 50 may also include a post engagement structure 54 which may be located on the cover assembly or on the bulkhead, but is most suitably mounted on the bulkhead. The post engagement structure 54 may be configured to releasably engage the post 52 and pull the post toward the bulkhead on which the post engagement structure 54 is mounted. The post engagement structure 54 may be configured to relax the engagement of the structure 54 with the post 52 in order to permit the foremost support bow to move away from the bulkhead. The post engagement structure 54 may be extendable from the bulkhead toward the post 52 on the support bow to release the cover assembly from it securement to the bulkhead. The post engagement structure 54 may also be retractable toward the bulkhead to cause securement of the cover assembly to the bulkhead. Movement of the post engagement structure toward the post 52 on the support bow and also toward the bulkhead may occur substantially in a horizontal direction.

In embodiments of the apparatus 10, the post engagement structure 54 may include a hook 60 which is configured to releasably engage the post 52. The hook 60 may have a mouth 62 which is configured to receive the post and release the post to permit the post to move out of the mouth. The hook 60 may have an abutment surface 64 for initially contacting the post 52, and in some embodiments the abutment surface may be configured such that the initial contact of the surface 64 with the post causes the hook 62 more move upwardly with respect to the post to permit the post to move into the mouth of the hook. Contact between the surface 64 and the post 52 may cause the hook 62 move upwardly and ride over the post until the post is able to enter the mouth of the hook to permit the hook to move downwardly as the post moves into the mouth. In the illustrative embodiments, the portions of the hook 60 forming the abutment surface 64 may be arrow-shaped with a pointed tip, although other configurations may be suitable.

The post engagement structure 54 may also include a hook support 66 which is configured to support the hook 60 with respect to the bulkhead, and may also move the hook with respect to the bulkhead. The hook support 66 may be configured to move the hook toward and away from the bulkhead, and correspondingly away from and toward the end of the cover assembly. The hook support 66 may be configured to move the hook between a release position (see, e.g., FIG. 13) corresponding to the release condition of the securing assembly, and a secured position (see, e.g., FIGS. 11 and 12) corresponding to the secured condition of the securing assembly, along a path between the release and secured positions. The hook support may also be configured to move the hook to a reception position (see, e.g., FIG. 12) corresponding to the reception condition of the securing assembly. The reception position of the hook may be located between the secured position of the hook and the release position, and the reception position may be located relatively closer to the release position than to the secured position. The path of the hook between the release and secured positions may be in a substantially horizontal direction, although some degree of variation from an entirely horizontal path may be utilized. For example, in the release position of the support 66, the hook may be slightly vertically higher, or at a slightly higher vertical level, than the hook when the support 66 is in the secured position and also when the support is in the reception position. The hook support 66 may be extendable to move the hook towards the release position and may be retractable to move the hook toward the secured position. The hook support may thus be extendable and retractable with respect to the bulkhead. The hook support 66 may lift or raise the hook 60 in a vertical direction as the hook approaches the release position of the hook support, and the hook support may lower the hook in a vertical direction as the hook moves from the release position of the hook support toward the reception position and secured position of the hook support.

The hook support 66 may comprise a support member 70 which may be characterized by having limited flexibility. The support member 70 may have a linear condition, and the support member may be flexible or bendable from the linear condition in a single direction, and may resist or prevent flexing of the support member from the linear condition in a direction that is opposite of the single direction. The support member 70 may also resist flexing or bending from the linear condition in directions that are lateral to the single direction. The support member 70 may thus bend or flex in a plane from the linear condition in the single direction, but not in the plane in the direction opposite to the single direction. Illustratively, the linear condition may correspond to a substantially horizontal orientation of the support member extending outwardly from the bulkhead, and a portion of the support member 70 extending from the bulkhead may be able to bend or flex in an vertically upward direction from the horizontal linear condition, but may be prevented or resisted from bending or flexing vertically downward direction from the horizontal linear condition. Furthermore, bending or flexing of the support member in a lateral horizontal direction from the horizontal linear condition may also be resisted or prevented. The resistance to the described movements may be provided by the characteristics of the support member itself. As a result, the support member 70 may be self-supporting, or able to support itself, in a substantially horizontal orientation as the support member is extended from the bulkhead without flexing or bending downwardly from the substantially horizontal orientation, while also permitting flexing or bending of portions of the support member upwardly from the substantially horizontal orientation such as when the post 52 initially engages the hook 60 (or vice versa). In addition to being self-supporting, the support member 70 also supports the hook 60 mounted on the support member as the hook moves along the path between the release and secured positions and permits the hook to move vertically when initially contacted by the post as the hook is in the reception position and the foremost support bow is moved toward the front bulkhead. These features of the support member of the post engagement structure of the securing assembly thus facilitate the engagement of the hook 60 of the post engagement structure with the post 52 without requiring human intervention or handling of the post or the post engagement structure of the securing assembly to accomplish the engagement of the engagement structure with the post. Thus the operator of the cover apparatus is not required to handle the post or the post engagement structure with his or her hand to accomplish the linking or unlinking of the hook with the post.

In some embodiments, the support member 70 may comprise a chain of links 72, 73, 74, and the links of the chain may be pivotable with respect to each other in a constrained manner. The links of the chain may be pivotable with respect to each other in two directions, but in only a single direction from a linear condition. The links of the chain may be pivotable in a direction opposite to the single direction, but only to the degree that the chain of links is restored to the linear condition without bending or flexing beyond the linear condition. In some embodiments, the chain of links may include a leading link 72, a trailing link 74 and a plurality of intermediate links 73 positioned between the leading and trailing links in the chain. At least one link of the chain of links may comprise a guide link 76, which is typically one of the intermediate links of the chain between the leading 72 and trailing 74 links of the chain. The guide link 76 may be configured to help guide movement of the hook support, and thereby the hook, as the hook support approaches the release position and cause the slight vertical movement of the hook in the release position. The guide link 76 may have a lateral pin 78 mounted thereon and extending from the guide link in a direction lateral to the length or longitudinal dimension of the chain of links. In some embodiments, a pair of the lateral pins 78 extends in substantially opposite lateral directions along a substantially common axis transverse to the longitudinal dimension of the chain. In some further embodiments, at least two lateral pins 78, 79 extend laterally from a lateral side of the chain, either from a single guide link or a pair of adjacent guide links. Each of these lateral pin 78, 79 may have a corresponding lateral pin extending in the opposite lateral direction along a substantially common axis.

The post engagement structure 54 may also include a hook movement structure 80 which is configured to move the hook 60 between the release and secured positions. The hook movement structure 80 may engage the hook support 66 to cause movement of the hook support, and thereby cause movement of the hook 60 between the secured and release positions along a path that may be substantially horizontal in orientation. In some embodiments, the hook movement structure 80 may include a sprocket 82 which is mounted on the bulkhead and engages the links 72, 73 of the support member 70 of the hook support. In operation, the sprocket 82 may be rotatable in a first rotational direction to cause extension of the hook support from the bulkhead, and correspondingly movement of the hook away from the bulkhead. Rotation of the sprocket 82 in a second (and opposite) rotational direction may cause retraction of the hook support with respect to the bulkhead, and correspondingly movement of the hook toward the bulkhead. Typically, rotation of the sprocket 82 may be caused by a motor 83 connected to the axle on which the sprocket 82 rotates, using any suitable gearing, although manual rotation of the sprocket 82 via a suitable handle (not shown) may be used alternatively or interchangeably with the motor 83.

The movement structure 80 may also include a housing 84 which is configured to receive at least a portion of the hook support member 70 to thereby function as at least a partial housing for the support member. The support member being movable with respect to the housing, and the housing may form a guide track 86 for receiving and housing the portion of the support member and for guiding movement of the support member between the various positions. The guide track 86 of the housing may have an exit 88 from which the support member may be extended from the housing and through which the support member may be retracted into the housing. Generally, the leading link 72 may be extendable from the housing while the trailing links 74 remains in the housing, and the guide link 76 also remains in the housing, when the securing assembly is changed from the secured condition to the release condition. In some embodiments, the guide track 86 may be substantially L-shaped, and in the illustrative embodiments the track may include a substantially horizontal section 90 of the track in a substantially vertical section 92 of the track. The substantially horizontal section 90 may be located adjacent to the exit 88.

The housing 84 may form at least one lateral slot 96 which is positioned along at least a portion of the guide track to receive at least one of the a lateral pins 78, 79. In some embodiments, a pair of lateral slots 96 may be located in opposite lateral sides of the guide track to receive lateral pins extending in opposite lateral directions from the guide link 76. The lateral slider slots may have a terminal portion 98 located adjacent to the exit 88 of the housing, although the terminal portion may not be in communication with the exit and thus may terminate at a location proximate to the exit. The terminal portion 98 may also be located adjacent to the substantially horizontal section 90 of the guide track, and may generally extend parallel to the horizontal section 90. However, while the substantially horizontal section 90 of the guide track may be substantially horizontally oriented, in some embodiments the terminal portion 98 of the lateral slots may be oriented at an angle to the horizontal such that the terminal portions of the slots rise to a higher vertical level toward the exit 88 of the guide track and fall to a lower vertical level away from the exit 88. The lateral slots may each have a substantially vertical portion 100 located adjacent to the substantially vertical section 92 of the guide track.

By the relationship and structure of the guide track for the chain of links and the lateral slot or slots for the lateral pin or pins, the orientation of the support member 70 may be changed as the support member moves from the secured position toward the release position, and in particular as the support member approaches the release position after having passed through the reception position. In greater detail, the guide track, and in particular the substantially horizontal section 90 of the guide track guides movement of the chain of links of the support member as the support member moves from the secured position, and the horizontal orientation of the horizontal section 90 causes the portion of the support member extending from the housing to have a horizontal orientation, and correspondingly the hook 60 to move along a substantially horizontal path. Such an orientation of the support member as well as the horizontal character of the hook path may continue as the support member passes through the reception position. As this movement occurs, the lateral pins move along the substantially vertical portion 100 of the lateral slots 96 without influence on the movement of the support member as the vertical portion 100 is generally oriented parallel to the substantially vertical section 92 of the guide track. When the guide link has moved along the guide track to an extent that the lateral pins move into the terminal portion 98 of the slot, the slight upwardly angled orientation of the terminal portion (which generally deviates from the substantially horizontal orientation of the section 90 of the guide track) tends to cause the support member to assume an upwardly inclined orientation which tends to lift the hook 60 in a vertical direction as the support member approaches and achieves the release position.

In some embodiments, the securing assembly or assemblies may be configured to operate to achieve an optimal tension in the covering sheet and then terminate operation to maintain that optimal tension. For example, when the securing assembly is operating to move the end of the cover assembly toward the bulkhead, a condition corresponding to the tension in the covering sheet may be monitored. When it is determined that the tension has substantially reached the optimal level, then rotation of the sprocket (such as by a motor) may be discontinued. Monitoring the tension in the covering sheet may be performed in any suitable manner, such as, for example monitoring a current draw by the motor or motors operating the sprocket or sprockets of the securing assemblies. It should be recognized that such operation may result in the foremost support bow of the cover assembly not coming into contact with the front bulkhead. Operation of the securing assembly based upon tension in the cover assembly, rather than movement of the end of the cover assembly to a particular point, may help to alleviate problems in tensioning the cover sheet when the geometry of the bed changes due to cargo loading on the bed. For example, beds which exhibit a degree of upward camber when unloaded may lose the upward camber when cargo is loaded onto the bed. Such variations in the camber of the bed can affect the effective length of the cover assembly needed to achieve the optimal tension in the covering sheet, and thus simply moving the end of the cover assembly to the bulkhead may result in over-tensioning of the covering sheet.

When the cargo cover apparatus is to be moved into a closed condition in which the cover assembly is engaged with the front bulkhead of the cargo cover apparatus and the space above the bed enclosed by the apparatus, a front end of the cover assembly, such as the foremost support bow, may be moved close to the bulkhead to a distance that is within the reach of the securing assembly when the securing assembly is in the reception condition. Prior to, or after, moving the front and proximate to the front bulkhead, the securing assembly 50 may be actuated to extend the hook support 66 from the bulkhead to the reception position, and thus toward the post 52 so that the hook 60 moves toward the post into position corresponding to the reception position of the securing assembly. The abutment surface 64 of the hook may be brought into contact with the post through movement of the foremost support bow toward the front bulkhead 12, or optionally movement of the hook support toward the reception position from the secured position while the post on the foremost support bow is positioned along the path of the hook 60 between the secured and reception positions of the hook support. Contact between the abutment surface and the post causes the hook to ride up on the post until the mouth of the hook is positioned above the post, and the hook moves downwardly to position the post within the mouth of the hook. The hook support 66 may be retracted toward the bulkhead to pull the post toward the bulkhead and move the support bow closer to the bulkhead until the end of the cover assembly is secured against the bulkhead. Significantly, the tensioning of the cover assembly, and more specifically the covering sheet, may be accomplished at one end of the cover apparatus (such as the front end) between the cover assembly and the bulkhead. The operator may accomplish this from a location adjacent to the front bulkhead and is not required to move to the rear end of the cover assembly to secure the rear end in position on the bed prior to securing the front end, or vice versa.

When the cargo cover apparatus is to be moved into an open condition in which the cover assembly is released or disengaged from the at least one bulkhead of the cargo cover apparatus and at least a portion of the space above the bed is to be exposed by the cover assembly, the securing assembly 50 may be actuated to extend the hook support 66 from the bulkhead to allow the tension and weight in the cover assembly to tend to move the support bows away from the bulkhead. As the hook approaches and reaches the release position, the divergence between the orientations of the guide track and the lateral slot causes the hook support member to pivot slightly upwardly from the initial orientation of the support member as the lateral pins engage the terminal portion of the lateral slot which in turn tends to raise the hook in an upward direction as it moves into the release position, which raises the mouth of the hook relative to the post 52 so that the post is able to move out of the mouth of the hook and move free of the influence of the hook of the securing assembly. The foremost support bow 32 may then be moved toward the rearmost support bow to a desired degree to expose a desired portion of the trailer bed 3 and any cargo rested thereon.

The housing 84 may be formed in any suitable manner, and in the illustrative embodiments the housing may be formed from a plurality of plates 102, 104 which are stacked together in an alignment to form a housing with the contours of the guide track as well as the lateral slots. At least some of the stacked plates 102, 104 may be formed with the apertures that defined the guide track of the housing, and at least some of the plates may be formed with slots that defined the lateral slots of the housing.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A cargo cover apparatus configured to selectively enclose a space above the upper surface of a cargo support bed having a forward end and a rearward end with a longitudinal axis of the bed extending between the ends, the cargo cover apparatus comprising:

a bulkhead mountable on the bed toward one said end of the bed;

a cover assembly mountable on the bed in a position between the forward and rearward ends of the bed, the cover assembly having a front end and a rear end, one of the ends of the cover assembly being orientable toward the bulkhead, the cover assembly being extendable and retractable to change a distance between the front end and the rear end of the cover assembly along the longitudinal axis of the bed, the cover assembly having a retracted condition characterized by the bulkhead and the cover assembly being spaced from each other and separated by a gap between the bulkhead and said one end of the cover assembly, the cover assembly having an extended condition characterized by said one end of the cover assembly being positioned adjacent to the bulkhead; and a securing assembly mounted on the bulkhead, the securing assembly being configured to move outwardly from the bulkhead into the gap separating the bulkhead and said one end of the cover assembly in the retracted condition of the cover assembly to engage said one end of the cover assembly and to pull said one end of the cover assembly toward-the bulkhead into a secured condition, the securing assembly securing said one end of the cover assembly to the bulkhead in the secured condition and releasing said one end of the cover assembly for free movement with respect to the bulkhead when the securing assembly is in a release condition.

2. The apparatus of claim 1 wherein the bulkhead comprises a front bulkhead mountable on the cargo support bed at the forward end of the bed, said one end of the cover assembly comprising the front end of the cover assembly; and wherein the securing assembly is configured to pull the front end of the cover assembly toward the front bulkhead.

3. The apparatus of claim 2 wherein the securing assembly is configured to secure a foremost support bow at the front end of the cover assembly to the front bulkhead.

4. The apparatus of claim 1 wherein the securing assembly is mounted on at least one lateral side of the bulkhead.

5. The apparatus of claim 4 wherein a said securing assembly is mounted on both lateral sides of the bulkhead.

6. The apparatus of claim 1 wherein the securing assembly is configured to move outwardly from the bulkhead in a substantially horizontal direction to engage the cover assembly.

7. The apparatus of claim 1 wherein the securing assembly has a reception condition in which the end of the cover assembly is able to be initially engaged with the securing assembly.

8. The apparatus of claim 1 wherein the cover assembly includes a support bow on one of the ends of the cover assembly positionable adjacent to the bulkhead; and
wherein the securing assembly further comprises:
a post mounted on the support bow of the cover assembly; and
a post engagement structure mounted on the bulkhead to engage the post on the support bow of the cover assembly, the post engagement structure being configured to releasably engage the post.

9. The apparatus of claim 8 wherein the post engagement structure is extendable in a substantially horizontal direction from the bulkhead in a self-supporting manner to reach and engage the post on the support bow when the bow is spaced from the bulkhead.

10. The apparatus of claim 9 wherein the post engagement structure is retractable in a substantially horizontal direction toward the bulkhead with the engaged post to pull the support bow toward the bulkhead.

11. The apparatus of claim 8 wherein the post engagement structure includes a hook with a mouth configured to removably receive the post and an abutment surface configured to lift the hook upon initial contact of the abutment surface with the post.

12. The apparatus of claim 8 wherein the post engagement structure includes a hook support configured to move the hook toward and away from the bulkhead, the hook support moving the hook along a path between a secured position relatively closer to the bulkhead and a release position relatively further from the bulkhead, the path of the hook between the release and secured positions being substantially horizontal with the release position being slightly vertically higher than the secured position.

13. The apparatus of claim 12 wherein the hook support of the securing assembly supports itself in a vertical direction when the hook support is extended from the bulkhead to engage the post of the securing assembly on the cover assembly.

14. A system comprising:
a vehicle bed having a longitudinal axis and an upper surface extending between forward and rearward ends; and
a cargo cover apparatus configured to selectively enclose a space above the upper surface of the vehicle bed, the cargo cover apparatus comprising:
a front bulkhead located on the vehicle bed toward the forward end of the bed;
a cover assembly mounted on the vehicle bed in a position between the forward and rearward ends of the bed, the cover assembly having a front end and a rear end, the front end of the cover assembly being orientable toward the front bulkhead, the cover assembly being extendable and retractable to change a distance between the front end and the rear end of the cover assembly along the longitudinal axis of the bed, the cover assembly having a retracted condition characterized by the bulkhead and the cover assembly being spaced from each other and separated by a gap between the bulkhead and the front end of the cover assembly, the cover assembly having an extended condition characterized by the front end of the cover assembly being positioned adjacent to the bulkhead; and
a securing assembly mounted on the bulkhead, the securing assembly being configured to move outwardly from the bulkhead into the gap separating the bulkhead and the front end of the cover assembly in the retracted condition of the cover assembly to engage the front end of the cover assembly and to pull the front end of the cover assembly toward-the bulkhead into a secured condition, the securing assembly securing the front end of the cover assembly to the bulkhead in the secured condition and releasing the front end of the cover assembly for free movement with respect to the bulkhead when the securing assembly is in a release condition.

15. The system of claim 14 wherein the securing assembly has a reception condition in which the front end of the cover assembly is able to be initially engaged with the securing assembly.

16. The system of claim 14 wherein the cover assembly includes a support bow on the front end of the cover assembly positionable adjacent to the bulkhead; and
wherein the securing assembly further comprises:
a post mounted on the support bow of the cover assembly; and
a post engagement structure mounted on the bulkhead to engage the post on the support bow of the cover assembly, the post engagement structure being configured to releasably engage the post.

17. The system of claim 16 wherein the post engagement structure is extendable from the bulkhead in a self-supporting manner to reach and engage the post on the support bow when the bow is spaced from the bulkhead.

18. The system of claim 17 wherein the post engagement structure is retractable toward the bulkhead with the engaged post to pull the support bow toward the bulkhead.

19. The system of claim 14 wherein the securing assembly is configured to move outwardly from the bulkhead in a substantially horizontal direction to engage the cover assembly.

20. A cargo cover apparatus configured to selectively enclose a space above the upper surface of a cargo support bed having a forward end and a rearward end with a longitudinal axis of the bed extending between the ends, the cargo cover apparatus comprising:
a bulkhead mountable on the bed toward the forward end of the bed;
a cover assembly mountable on the bed in a position between the forward and rearward ends of the bed, the cover assembly having a front end and a rear end, the front end of the cover assembly being orientable toward the bulkhead, the cover assembly being extendable and retractable to change a distance between the front end and the rear end of the cover assembly along the longitudinal axis of the bed, the cover assembly having a retracted condition characterized by the bulkhead and the cover assembly being spaced from each other and separated by a gap between the bulkhead and the cover assembly, the cover assembly having an extended condition characterized by the front end of the cover assembly being positioned adjacent to the bulkhead, the cover assembly including a foremost support bow on the front end of the cover assembly positionable adjacent to the bulkhead; and a securing assembly mounted on each lateral side of the bulkhead, the securing assembly being configured to move outwardly from the bulkhead in a substantially horizontal direction into the gap separating the bulkhead and the front end of the cover assembly in the retracted condition of the cover assembly to engage the front end of the cover assembly and to pull the front end of the cover assembly toward-the bulkhead into a secured condition, the securing assembly securing the front end of the cover assembly to the bulkhead in the secured condition and releasing the front end of the cover assembly for free movement with respect to the bulkhead when the securing assembly is in a release condition;

wherein each securing assembly comprises:

a post mounted on the foremost support bow of the cover assembly; and a post engagement structure mounted on the bulkhead to engage the post on the foremost support bow of the cover assembly, the post engagement structure being configured to releasably engage the post, the post engagement structure being extendable from the bulkhead in a self-supporting manner to reach and engage the post on the support bow when the bow is spaced from the bulkhead, the post engagement structure being retractable toward the bulkhead with the engaged post to pull the support bow toward the bulkhead, the post engagement structure including a hook with a mouth configured to removably receive the post and an abutment surface configured to lift the hook upon initial contact of the abutment surface with the post.

\* \* \* \* \*